United States Patent [19]
Watanabe

[11] Patent Number: 5,473,743
[45] Date of Patent: Dec. 5, 1995

[54] CHARACTER GENERATOR WITH SELECTABLE CONVERSION

[75] Inventor: Kiyoshi Watanabe, Kawasaki, Japan

[73] Assignee: Canon Kabushiki Kaisha, Tokyo, Japan

[21] Appl. No.: 144,548

[22] Filed: Nov. 1, 1993

Related U.S. Application Data

[63] Continuation of Ser. No. 37,174, Mar. 24, 1993, abandoned, which is a continuation of Ser. No. 512,155, Apr. 20, 1990, abandoned.

[30] Foreign Application Priority Data

Apr. 21, 1989 [JP] Japan ........................................ 1-99934

[51] Int. Cl.[6] ..................................................... G06T 11/60
[52] U.S. Cl. ............................................ 395/151; 345/195
[58] Field of Search ..................................... 395/110, 150, 395/151; 345/192, 194, 195; 340/735, 790

[56] References Cited

U.S. PATENT DOCUMENTS

| | | | |
|---|---|---|---|
| 4,741,635 | 5/1988 | Shibata et al. | 400/121 |
| 4,849,748 | 7/1989 | Katsuta | 345/194 |
| 4,951,226 | 8/1990 | Sasaki | 395/151 |
| 4,992,954 | 2/1991 | Takeda et al. | 395/151 |
| 5,151,954 | 9/1992 | Takai et al. | 395/151 X |

FOREIGN PATENT DOCUMENTS

| | | | |
|---|---|---|---|
| 0196794 | 8/1986 | European Pat. Off. . | |
| 2626697 | 8/1989 | France . | |
| 0003083 | 1/1983 | Japan | 395/110 |
| 58-114289 | 7/1983 | Japan . | |

*Primary Examiner*—Mark K. Zimmerman
*Attorney, Agent, or Firm*—Fitzpatrick, Cella, Harper & Scinto

[57] ABSTRACT

A character processor stores a character code corresponding to a pattern whose type face modification is inhibited in a memory so that the character code is distinguishable from others. Whether type face modification of the pattern is inhibited is determined in response to an instruction for modifying type face of a pattern and the pattern is modified responsive to the instruction if type face modification of this pattern is not inhibited.

20 Claims, 4 Drawing Sheets

| NO | FLAG | X | Y |
|---|---|---|---|
| 0 | START | 0 | 500 |
| 1 | | 100 | 500 |
| 2 | | 100 | 100 |
| 3 | | 400 | 100 |
| 4 | | 400 | 0 |
| 5 | END | 0 | 0 |

4-2

| CHR CODE | PATTERN ADDRESS | MOD. DATA. NO. |
|---|---|---|
| 1 | 1000 | 1 |
| 2 | 1350 | 1 |
| 3 | 800 | 2 |
| 4 | 8788 | 2 |
| 5 | 2500 | 1 |

4-1

| | H1 | H2 |
|---|---|---|
| a | 1.0 | 1.0 |
| b | 0.0 | 0.3 |
| c | 0.0 | 0.0 |
| d | 1.0 | 1.0 |

5

CHARACTER GENERATOR WITH SELECTABLE CONVERSION

This application is a continuation of application Ser. No. 08/037,174 filed Mar. 24, 1993, now abandoned, which is a continuation application of Ser. No. 07/512,155 filed Apr. 20, 1990, abandoned.

BACKGROUND OF THE INVENTION

1. Field of the Invention

The present invention relates to a character generator, and more particularly to a character generator for converting a character/symbol code into a corresponding dot (font) pattern.

2. Related Background Art

In the field of printing, various European type faces are known. A series of characters of the same group is called a family. In printing an article in European languages, a particular family is selectively used from the view point of type face design, and layout of the head and body of the article. A series of characters including upper case letters, lower case letters, numerals, symbols, and punctuation marks have its own type face such as italic face, bold face, condensed face or the like.

At first sight, the italic face and condensed face, for example, are considered that they are obtained by modifying a regular face obliquely and lengthwise, respectively. However, the font patterns of a family are designed for each pattern independently, and have specific type faces.

A display or printer for outputting European characters of various type faces is therefore required to have font data specific to respective type faces.

In recent years, in order to reduce the capacity of font data, a simple printer uses a series of standard font patterns and if another series of font patterns are required, the standard font patterns are modified in a simple manner. Such simple modification is not sufficient for most of European type faces. However, a sans-serif type face having a relatively simple style, typically Helvetica, can be generated by modifying standard font patterns at the sacrifice of design.

In a conventional character generator, an oblique modification, lengthwise modification or flattening modification is carried out for all standard font patterns to obtain a desired type face. Therefore, even a character such as an underline which is not desired to be modified, undergoes such modification.

In order to solve this problem, the type face of each character may be designated. However, such designating process becomes a burden on a character code generator of, e.g., a word processor handling a large number of characters in writing a document thereby taking a longer time in word processing.

SUMMARY OF THE INVENTION

The present invention has been made in view of the above problem. It is therefore an object of the present-invention to provide a character generator capable of modifying standard font patterns into another series of font patterns without modifying a particular character which is not desired to be modified.

It is another object of the present invention to provide a character generator for converting a character-code into a corresponding font pattern, comprising memory means for storing a character code of a character whose type face modification is inhibited, discriminator means for judging whether or not a character code to be converted into a font pattern is stored in said memory means, and pattern generator means for converting a character code into a font pattern having a type face externally designated if the judgement by said discriminator means is negative, and converting a character code into a predetermined standard font pattern irrespective of a presence/absence of external designation of a type face if the judgement by said discriminator means is affirmative.

It is yet another object of the present invention to provide a character generator wherein a particular character/symbol code which is not allowed to modify the type face is previously stored in memory means, so that while referring to the contents of memory means, it is possible to automatically determine whether or not a modification of a font pattern into a different type face is allowed.

According to this invention, an external device is not requested to designate a character/symbol not to be modified. On the side of the character generator, a type face is designated once for all font patterns without designating a type face for each character.

It is a further object of the present invention to provide a character generator comprising instructing means for instructing outputting of a character with a first type face or with a second type face, modifying means for modifying a character with said first type face into a character with said second type face, memory means for storing information representative of whether a character with said first type face is allowed to be modified by said modifying means, and means for controlling the modification of a character with said first type face by said modifying means in accordance with the information stored in said memory means, if said instructing means instructs outputting of a character with said second type face.

DESCRIPTION OF THE PREFERRED EMBODIMENTS

The embodiments of the present invention will be described with reference to the accompanying drawings. The invention is obviously applicable to a character generator and an output apparatus having the character generator.

Figure 1:
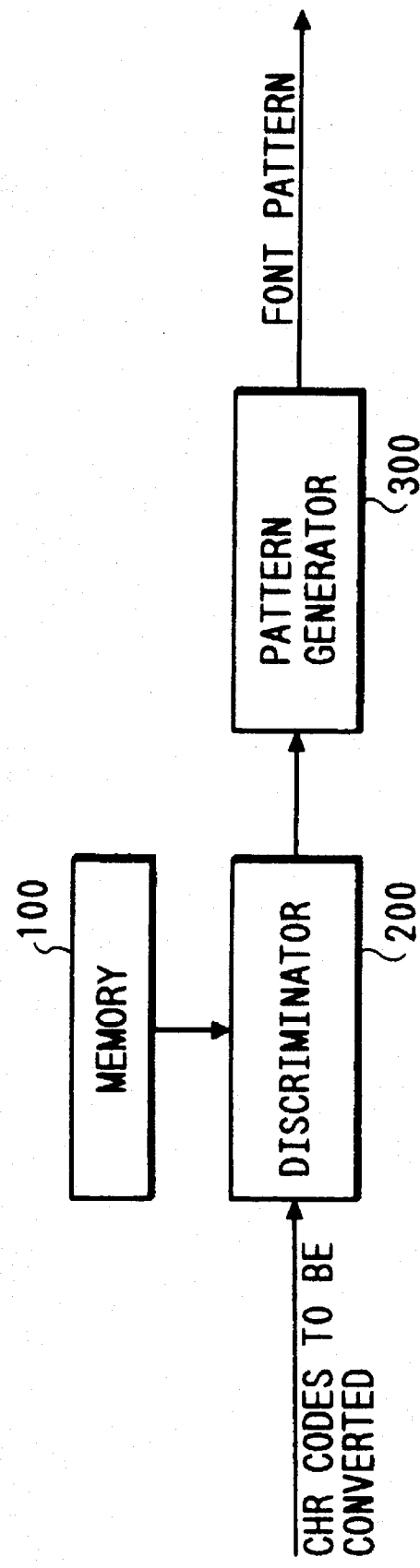
FIG. 1 is a block diagram showing the basic structure of an embodiment of this invention.

FIG. 1 shows the fundamental structure of an embodiment according to this invention.

Referring to FIG. 1, in a character generator for converting a character code into a corresponding font pattern, reference numeral 100 represents memory means for storing a character code of a character whose type face modification is inhibited.

Reference numeral 200 represents discriminator means for judging whether or not a character code to be converted into a font pattern is stored in memory means.

Reference numeral 300 represents pattern generator means for converting a character code into a font pattern having a type face externally designated if the judgement by said discriminator means is nagated, and converting a character code into a predetermined standard font pattern irrespective of a presence/absence of external designation of a type face if the judgement by said discriminator means is affirmative.

Figure 2:
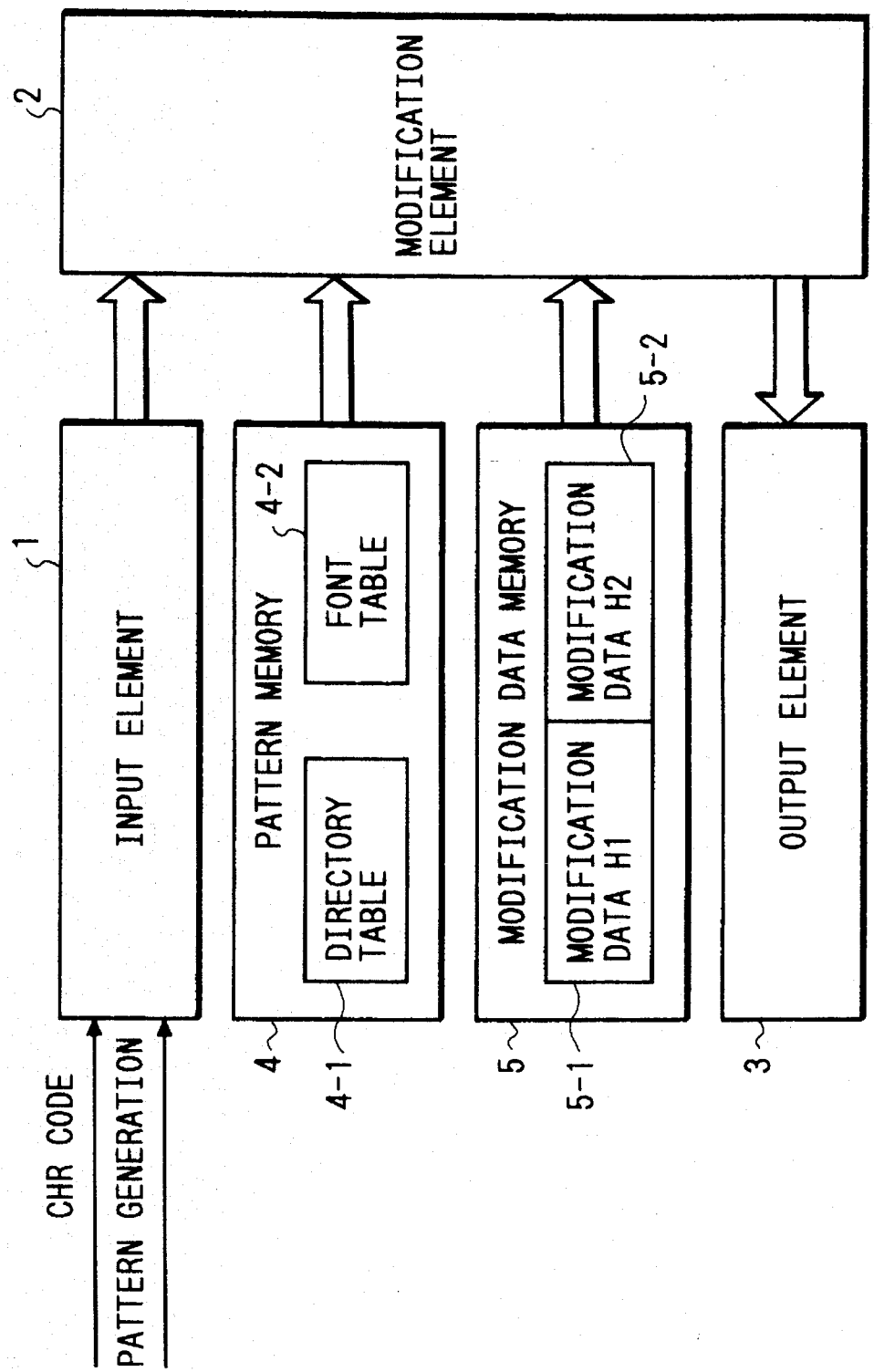
FIG. 2 is a block diagram showing the circuit arrangement of an embodiment of this invention.

FIG. 2 shows the circuit arrangement of an embodiment of this invention.

Referring to FIG. 2, reference numeral 1 represents an input element from which entered are a character code of a character to be converted, and a pattern generation instruction for designation the type face of a font pattern. The input element 1 is constructed of a signal holding circuit made of buffers, flip-flops and the like. Reference numeral 2 represents a modification element for converting a character code signal entered from the input element 1 into a font pattern having a predetermined type face. The modification element 2 is constructed of a central processing unit CPU. The modification unit 2 serves as the discrimination means and pattern generator means. Reference numeral 4 represents a pattern memory for previously storing font patterns of a standard type face for respective character codes, and a character code of a character whose type face is inhibited to be modified, respectively at the addresses corresponding to the character codes. The pattern memory 4 is constructed of a non-volatile memory such as a read-only memory.

Reference numeral 5 represents a modification data memory for storing modification rules by which the standard type face is modified into various different type faces. The modification data memory 5 is constructed of a non-volatile memory.

Reference numeral 3 represents an output element from which a font pattern subjected modification by the modification element 2 is outputted. The output element 3 is constructed of a signal holding circuit and parallel/serial conversion circuit.

The input element 1, pattern memory 4, modification data memory 5 and output element 3 are controlled by the modification element 2.

Figures 3A, 3B, 4, 5:
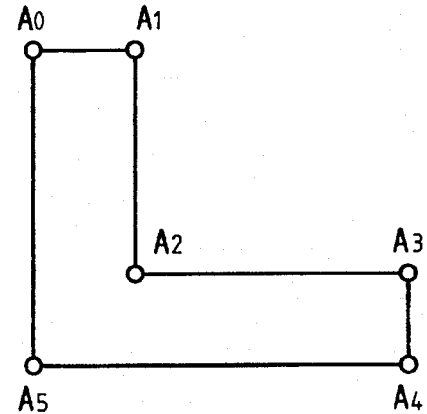
FIGS. 3A and 3B show an example of the contents of the font table 4-2 of the embodiment shown in FIG. 2, and the corresponding font pattern, respectively.
FIG. 4 shows an example of the contents of the directory table 4-1 of the embodiment shown in FIG. 2.
FIG. 5 shows an example of the contents of the modification data memory 5 of the embodiment shown in FIG. 2.

FIG. 3A shows an example of the contents of a font table 4-2 in the pattern memory shown in FIG. 2, and FIG. 3B shows the corresponding font pattern.

A character "L" as exemplarily shown in FIG. 3B is represented by a plurality of values which are obtained by vector developing the coordinates values of corners of the character starting from the reference point A0.

FIG. 4 shows an example of the contents of a directory table 4-1 in the pattern memory 4.

Referring to FIG. 4, pattern addresses and modification data numbers are stored in the directory table at the addresses designated by character codes. This pattern address is a memory address of the font table shown in FIG. 3A which stores the corresponding font pattern. The modification data number is a number discriminating between a character code whose character type face is allowed to be modified and a character code whose character type face is not allowed to be modified. In accordance with this modification data number, a standard font pattern or a obliquely modified font pattern is generated. In this embodiment, the standard font pattern stored in the font table 4-2 is modified according to the modification equations to be described below.

FIG. 5 shows an example of the contents of the modification data memory 5 shown in FIG. 2.

Referring to FIG. 5, the coefficients used with the modification equations corresponding to the modification number are stored in the modification data memory 5. In this embodiment, the coordinates X and Y after font pattern modification are calculated by using $X = ax + by$ ... (1)

$Y = cx + dy$ ... (2)

where a, b, c and d are coefficients stored in the modification data memory 5, and x and y are pixel coordinates of a font pattern stored in the font table 4-2 in the pattern memory 4.

The coefficients a, b, c and d of the modification data H1 are determined so as not to perform an oblique modification of a standard font pattern, whereas those of the modification data H2 are determined so as to perform an oblique modification. For example, symbols such as an underline and is not subjected to an oblique modification, and ordinary character are subjected to the oblique modification.

The operation of the circuit shown in FIG. 2 will be described with reference to the flow chart shown in FIG. 6.

Figure 6:
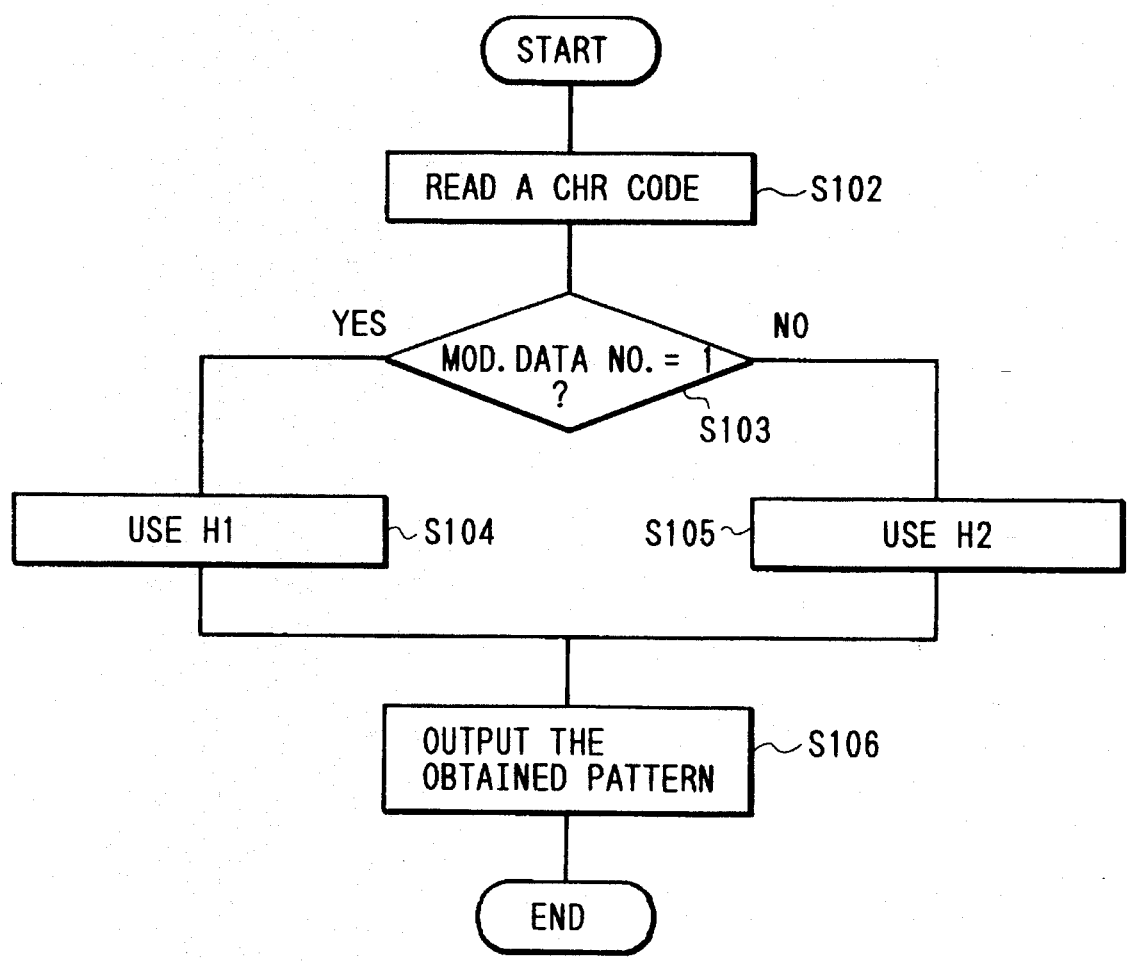
FIG. 6 is a flow chart showing the control procedure to be executed by the modification processing element 2 shown in FIG. 2.

The control procedure shown in FIG. 6 is stored in a ROM of the modification element 2, and executed by CPU.

Referring to FIG. 6, at step S102 a character code to be converted is read from the input element 1. Next, at step S103, the corresponding modification data number is read from the directory table 4-1 shown in FIG. 4. If the read modification data number is "1", pattern development for a standard type face is carried out by using the modification data H1 (step S104), whereas if the read modification data number is "2", pattern development for an obliquely modified type face is carried out by using the modification data H2 (step S105).

At step S106 the developed character pattern is outputted from the modification element 2 to an output device via the output element 3. The output device may be a printing system, CRT, telephone line or the like to which patterns can be transferred through electric coupling, magnetic coupling or the combined coupling. The control procedure is completed by steps S102 to S106.

Various modifications of this invention are possible as in the following.

(1) In the above embodiment, font patterns having two types of type faces, i.e., standard and modified type faces, are outputted. The number of modified type faces may be two or more. In this case, the modification data for two or more type faces are stored in the modification memory 5, and the type face to be used is externally designated once for a document to be made.

(2) In the above embodiment, there are stored in the directory table 4-1 the pattern address and the modification number which is used to discriminate between a character code with enabled modification and a character code with disabled modification. The modification data number may be detected by decoding a character code read from the input element 1 to send the detected number to the modification element 2. As appreciated from the foregoing description of this invention, a particular character/symbol code which is not allowed to modify the type face is previously stored in memory means, so that while referring to the contents of memory means, it is possible to automatically determine whether or not a modification of a font pattern into a different type face is allowed. An external device is not requested to designate a character/symbol not to be modified. On the side of the character generator, a type face is designated once for all font patterns without designating a type face for each character.

I claim:

1. A character processing apparatus comprising:

memory means for storing data representing a character pattern corresponding to a character code and storing identification information for identifying, for each character, whether typeface modification of a character pattern is to be inhibited upon generation of the character pattern;

means for determining, on the basis of the identification information, whether typeface modification of a character pattern to be output is to be inhibited, upon generation of the character pattern, in response to a typeface modification instruction; and means for generating the character pattern to be output on the basis of the data representing the character pattern stored in said memory means without executing typeface modification in response to the instruction, in the event that said determining means determines that the typeface modification is to be inhibited for the character pattern.

2. An apparatus according to claim 1, wherein the identification information comprises the character code for a character whose typeface modification is to be inhibited.

3. An apparatus according to claim 1, further comprising means for outputting the character pattern generated by said generating means.

4. An apparatus according to claim 3, wherein said output means comprises a printer device or a display device.

5. An apparatus according to claim 1, wherein the typeface modification comprises an oblique modification of a typeface.

6. An apparatus according to claim 1, wherein the data representing a character pattern comprises coordinate data.

7. An apparatus according to claim 1, wherein said generating means generates the character pattern to be output on the basis of the data representing the character pattern stored in said memory means by executing typeface modification in response to the instruction, in the event said determining means determines that the typeface modification is not to be inhibited for the character pattern.

8. An apparatus according to claim 1, wherein the character pattern whose typeface modification is to be inhibited comprises a rule line symbol.

9. An apparatus according to claim 1, wherein the typeface modification of a character pattern is executed by converting the data representing the character pattern using a coefficient stored in said memory means.

10. An apparatus according to claim 9, wherein the coefficient stored in said memory means differs according to a kind of typeface modification.

11. A character processing method using a memory which stores data representing a character pattern corresponding to a character code and identification information for identifying, for each character, whether typeface modification of a character pattern is to be inhibited upon generation of the character pattern, comprising the steps of:

determining, on the basis of the identification information, whether typeface modification of a character pattern to be output is to be inhibited, upon generation of the character pattern, in response to a typeface modification instruction; and generating the character pattern to be output on the basis of the data representing the character pattern stored in said memory without executing typeface modification in response to the instruction, in the event it is determined that the typeface modification is to be inhibited for the character pattern.

12. The method according to claim 11, wherein the identification information includes the character code for a character whose typeface modification is to be inhibited.

13. A method according to claim 11, further comprising the step of outputting the generated character pattern.

14. A method according to claim 13, wherein the outputting is performed by a printer device or a display device.

15. A method according to claim 11, wherein the typeface modification includes an oblique modification of a typeface.

16. A method according to claim 11, wherein the data representing a character pattern comprises coordinate data.

17. A method according to claim 11, wherein said the character pattern to be output is generated on the basis of the data representing the character pattern stored in said memory by executing typeface modification in response to the instruction, in the event it is determined that the typeface modification is not to be inhibited for the character pattern.

18. A method according to claim 11, wherein the character pattern whose typeface modification is to be inhibited includes a rule line symbol.

19. A method according to claim 11, wherein the typeface modification of a character pattern is executed by converting the data representing the character pattern using a coefficient stored in said memory.

20. A method according to claim 19, wherein the coefficient stored in said memory differs according to a kind of typeface modification.

* * * * *

UNITED STATES PATENT AND TRADEMARK OFFICE
CERTIFICATE OF CORRECTION

PATENT NO. : 5,473,743
DATED : December 5, 1995
INVENTOR(S) : Kiyoshi Watanabe, et al It is certified that error appears in the above-indentified patent and that said Letters Patent is hereby corrected as shown below:

COLUMN 1

Line 58 "present-invention" should read --present invention--;

Line 65 "character-code" should read --character code--.

COLUMN 3

Line 9 "nagated" should read --negated,--.
Line 19 "designation" should read --designating--;
Line 41 "Subjected" should read --subjected to--.

COLUMN 4

Line 21 "and is" should read --are--;
Line 23 "character" should read --characters--.

UNITED STATES PATENT AND TRADEMARK OFFICE
CERTIFICATE OF CORRECTION

PATENT NO. : 5,473,743
DATED : December 5, 1995
INVENTOR(S) : Kiyoshi Watanabe, et al It is certified that error appears in the above-indentified patent and that said Letters Patent is hereby corrected as shown below:

<u>COLUMN 6</u>

Line 4 close up right margin.
      Line 34 "said" should be deleted.

Signed and Sealed this

Sixteenth Day of April, 1996

Attest:

BRUCE LEHMAN

Attesting Officer      Commissioner of Patents and Trademarks